No. 895,335. PATENTED AUG. 4, 1908.
W. BROWN.
NUT LOCK.
APPLICATION FILED JULY 10, 1907.

Witnesses
Samuel Payne.
A. H. Butler.

Inventor
William Brown

By H. C. Butler Co.
Attorneys

UNITED STATES PATENT OFFICE.

WILLIAM BROWN, OF WEST BRIDGEWATER, PENNSYLVANIA.

NUT-LOCK.

No. 895,335.      Specification of Letters Patent.      Patented Aug. 4, 1908.

Application filed July 10, 1907. Serial No. 383,020.

*To all whom it may concern:*

Be it known that I, WILLIAM BROWN, a citizen of the United States of America, residing at West Bridgewater, in the county of Beaver and State of Pennsylvania, have invented certain new and useful Improvements in Nut-Locks, of which the following is a specification, reference being had therein to the accompanying drawing.

This invention relates to improvements in nut locks, and the invention has for its object the provision of positive and reliable means for preventing the accidental rotation of a nut upon a bolt, after it has been once placed thereon.

Another object of this invention is to provide a nut lock particularly designed for the nuts and bolts of rail joints, and such elements subjected to vibratory stresses and strains.

To this end, I have devised a simple and inexpensive nut lock, wherein a slotted bolt, slotted washer and piece of wire are used for locking the nut in engagement with a bolt, the wire being easily and quickly bent to release the nut when it is desired to remove the same from the bolt.

Figure 1:
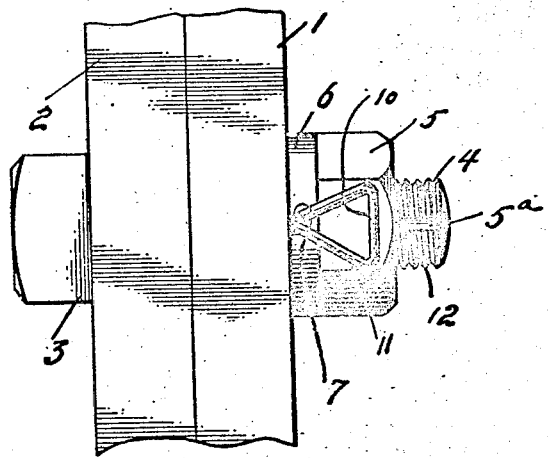
Figure 2:
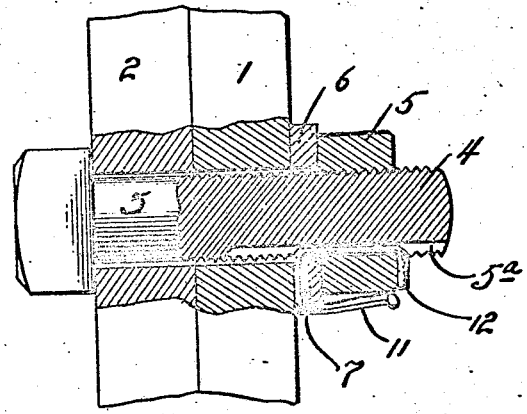
Figure 3:
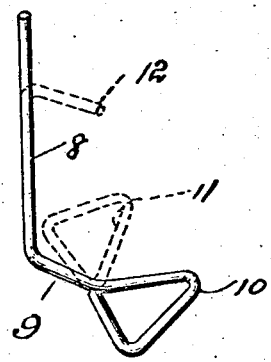

In the drawings, Figure 1 is an elevation of my improved nut lock, Fig. 2 is a longitudinal sectional view of the same, and Fig. 3 is a perspective view of a piece of wire constructed in accordance with my invention, for locking a nut upon a bolt.

In the accompanying drawings, 1 and 2 designate two pieces of material through which a bolt 3 passes, the threaded end 4 of said bolt being provided with a longitudinally disposed slot $5^a$. In connection with the bolt 3 I use a conventional form of nut 5, and a washer 6, the washer being provided with a radially disposed slot 7, the object of which will presently appear.

My improved nut lock constitutes a piece of wire 8 having one end bent substantially at right angles thereto, as at 9, and then bent to provide a triangular configuration, as at 10.

After the washer 6 has been placed upon the threaded and slotted end of the bolt 3, the piece of wire 8 is placed in the slot $5^a$ of the bolt 3, and then the nut 5 is rotated until the same engages the washer 6. The triangular configurated end of the piece of wire 8 is then bent over the washer to engage one side of the nut 5, as at 11, while the opposite end of the piece of wire 8 is bent downwardly as at 12, to engage the outer face of the nut 5. It figuration of the piece of wire 8 prevents the nut 5 from rotating, as long as a portion of the piece of wire is retained within the longitudinally disposed slot $5^a$ of the bolt 3, therefore it will be observed that the triangular portion may be dispensed with.

The ends of the piece of wire constituting my improved nut lock can be easily and quickly bent to release the nut 5 at any time it is desired to remove the nut from the bolt 3.

Having fully described my invention, what I claim and desire to secure by Letters Patent is:—

In a nut lock, the combination with a bolt having a screw threaded end provided with a longitudinally disposed groove, a hexagonal nut adapted to be mounted upon the screw-threaded end of said bolt and having a portion of its outer face flattened, a washer positioned against the nut and having its inner face formed with a radially extending groove constituting a seat, the depth of said groove approximately half the thickness of the washer, said groove of a length as to extend from the inner to the outer edge of the washer and a fastening member consisting of an elongated cylindrical bar bent to have its outer end overlap a part of the flat portion of the outer face of the nut, said member further having a portion of its length positioned within the groove of the bolt and extending through the nut and washer, said member further having a portion of its length engaging in said seat, the diameter of the member with respect to the depth of the groove which constitutes the seat being such that that portion of said member which is mounted in said seat does not project beyond the inner face of the washer, said member having another portion of its length arranged exteriorly of the washer and nut and bent to engage the periphery of the washer and then at an inclination, that portion of said member which engages the periphery of the washer and the side of the nut being substantially triangular in contour with the apex of the triangle positioned against the periphery of the washer and with the base of the triangle bearing directly against the nut, the ends of said member being disconnected from each other.

In testimony whereof I affix my signature in the presence of two witnesses.

WILLIAM BROWN.

Witnesses:
    EDWIN S. WEYAND,
    LEWIS GRAHAM.